United States Patent [19]

Wisniewski

[11] Patent Number: 4,833,444
[45] Date of Patent: May 23, 1989

[54] BICYCLE BRAKE LIGHT SYSTEM

[76] Inventor: Gary C. Wisniewski, 3599 Mission Blvd., No. 6, San Diego, Calif. 92109

[21] Appl. No.: 77,387

[22] Filed: Jul. 24, 1987

[51] Int. Cl.$^4$ ................................................ B62J 6/00
[52] U.S. Cl. .................................. 340/432; 200/61.12; 340/479
[58] Field of Search .................. 340/134; 74/484, 489, 74/492, 495; 200/61.12

[56] References Cited

U.S. PATENT DOCUMENTS

| | | | |
|---|---|---|---|
| 2,301,250 | 11/1942 | Callan | 340/134 |
| 2,449,200 | 9/1948 | Boucher | 340/134 |
| 2,449,782 | 9/1948 | Knitter | 340/134 |
| 3,188,418 | 6/1965 | Pino | 340/134 |
| 3,878,387 | 4/1975 | Kovacie | 340/134 |
| 4,586,021 | 4/1986 | Nickols | 340/134 |

FOREIGN PATENT DOCUMENTS 2306120 10/1976 France ................................ 340/134

Primary Examiner—Joseph A. Orsino
Assistant Examiner—Jill D. Jackson
Attorney, Agent, or Firm—Baker, Maxham, Jester & Meador

[57] ABSTRACT

A brake light system for a bicycle comprises a light housing having a self-contained power supply, and a light unit with a red lens includes an elongated conductor cable having a remotely positionable pressure actuatable switch for positioning between a brake cable and a frame portion of a bicycle or other brake actuating elements of a bicycle for responding to pressure applied thereby for actuating the brake light.

10 Claims, 2 Drawing Sheets

BICYCLE BRAKE LIGHT SYSTEM

BACKGROUND OF THE INVENTION

The present invention relates to bicycle accessories and pertains particularly to a brake light unit for bicycles.

Brake light systems which are responsive to the application of brakes are widely used and well known for motor vehicles. Such motor vehicles, including motorcycles, have electrical systems and the provision of light systems, including brake actuated responsive brake lights which are easily installed on such motor vehicles.

Bicycles which are manually powered do not normally have an electrical system. Therefore, they rely heavily on reflectors and are not normally equipped with lights, except in instances where they are expected to be ridden extensively at night in non-lighted areas. When so equipped, the light systems however are typically small, self-contained lights powered by small dry cell batteries. Therefore, bicycles are occasionally equipped with reflectors and lights for night riding but are not known to be equipped with brake lights.

Bicycles are most often ridden on streets and highways where they compete with motor vehicles for the right of way. In such use of bicycles, it is desirable that following motorists be able to easily see the bicycle and ascertain when brakes are applied on the bicycles. For this reason, it is desirable that brake lights responsive to the application of brakes be available for bicycles.

SUMMARY AND OBJECTS OF THE INVENTION

It is, therefore, the primary object of the present invention to provide an improved brake light system for bicycles.

In accordance with the primary aspect of the present invention, a brake light system for bicycles comprises a stop light unit, a power system and a remote pressure actuable switch positionable on a bicycle frame for responding to the application of the brakes of the bicycle for actuation of the light.

BRIEF DESCRIPTION OF THE DRAWING

The above and other objects and advantages of the present invention will become apparent from the following description when read in conjunction from the accompanying drawings wherein.

DETAILED DESCRIPTION OF A PREFERRED EMBODIMENT

Figure 1:
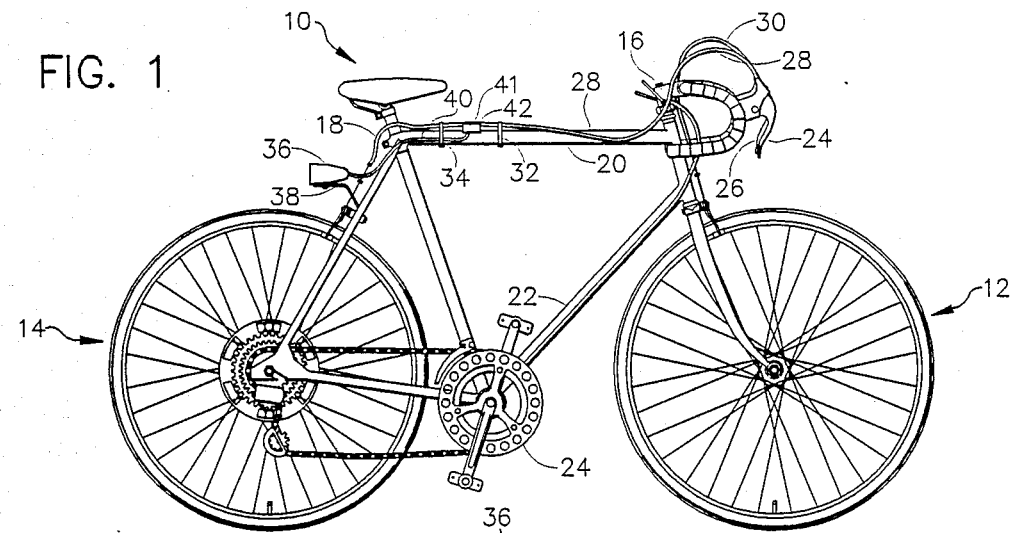
FIG. 1 is a side elevation view of a bicycle embodying the present invention.

Referring to FIG. 1 of the drawing, there is illustrated a side elevation view of a typical bicycle in wide use today embodying a stop light system according to the invention. The bicycle, designated generally by the numeral 10, includes a front wheel assembly 12, a rear wheel assembly 14 mounted on a frame assembly by means, for example, of a front fork unit and handlebar unit 16, and a rear fork unit 18. The frame includes upper horizontal tube 20, a lower connecting tube 22 and a vertical connecting tube 21. A pedal assembly 24 drives the rear wheel through a shiftable chain and sprocket assembly in a typical fashion.

The bicycle, as illustrated, is equipped with caliper type brakes actuated by hand levers or actuators 24 and 26 on the handlebars connected by means of Bowden type cables 28 and 30 to the rear caliper brakes and front caliper brakes, respectively. The cable assembly 28 extends along the upper tube 22 and is secured thereto by cable ties 32 and 34.

A brake light assembly, in accordance with the present invention, comprises a light unit 36, which is mounted by means of for example a bracket 38 to a back portion of the vehicle frame. A conductor cable 40 extends from the light housing 36 to position a remotely positionable pressure responsive switch 42 at a position as illustrated on the horizontal tube 20 beneath the brake actuating cable 28. The switch is of a type that is normally biased to an open position and has an external moveable actuator that closes the switch contacts upon movement of the actuator. Such switches are available as an off the shelf item from many electrical supply houses.

The mounting of the switch beneath the cable positions the switch such that when the brakes are applied to the rear wheels, the cable is tensioned and thereby tends to straighten and applies a pressure to the actuator of the switch 42. This straightening of the cable depresses the switch outward and actuates the switch, completing the electrical circuit which activates the brake light 36. The brake light 36 is preferably positioned somewhere on the rear of the bicycle and mounted preferably at a height such that it is easily visible by the driver of a motor vehicle trailing the bicycle. Various mounting positions and arrangements may be provided to position the light unit at an appropriate height on the rear of the bicycle.

Figure 2:
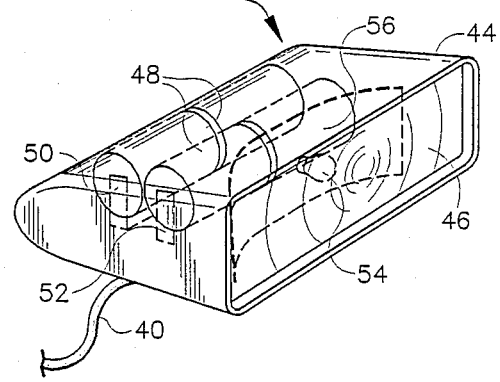
FIG. 2 is a perspective view with portions broken away showing a typical stoplight unit in accordance with the invention.

Referring now to FIG. 2 of the drawing, the light unit 36 is illustrated, for example, in slightly greater detail and comprises in general a generally rectangular box-like housing 44 having an open front enclosed by means of a red fresnel lens 46. The housing 44 may be constructed of any suitable material, such as plastic or metal. The housing 44 may be basically a unitary construction with an insertable or detachably mountable lens 46 as desired. The lens 46 may be constructed of a suitable plastic or glass as desired.

The housing 44 is preferably formed of sufficient size to accommodate a suitable source of electrical power, such as batteries, for the light unit. For example, as illustrated, the housing accommodates four D cell, dry cell batteries 48, which are mounted in a suitable fashion between mounting conductors 50 and 52, which are appropriately connected through conductive wires and the like to a light bulb 54, which is mounted in a suitable light socket in a reflector unit 56. The circuit for the light includes a two conductor cable 40 which extends to and is connected to the switch unit 42.

Figure 3:
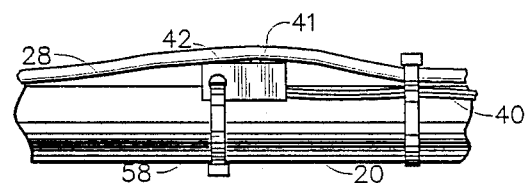
FIG. 3 is a detail view showing the switch unit of the invention.

Turning to FIG. 3, there is illustrated in slightly more detail the mounting of the switch unit 42. The switch unit 42 having an actuator button or bar 41 is mounted on the horizontal tube 20 of the bike frame, and may be secured in position such as by means of a cable tie 58 in a position such that the actuator thereof is directly beneath and engaged by the sheathed brake cable 28. More particularly as illustrated in FIG. 3, the switch is mounted between laterally adjacent elongated portions of the frame and cable, with the cable partially curved about the switch. Thus, when the brake is actuated, the cable 28 tends to straighten, thereby applying pressure to depress the switch unit 42. The switch unit 42 may be any suitable form of micro switch having an external actuator responsive to pressure for completing or causing the engagement of contacts on the interior thereof. The conductor cable 40 is connected between the connectors in the light and the two terminals of the micro switch 42. Thus, upon completion or closing of the switch 42, the electrical circuit is completed, thus activating the stoplight.

Figure 4:
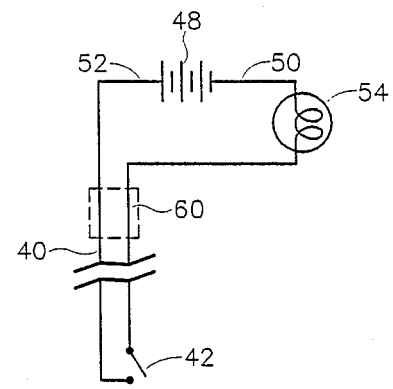
FIG. 4 is a schematic illustration of a circuit of the present invention.

Referring to FIG. 4, a schematic illustration of the light system is illustrated. As shown in FIG. 4, a light bulb 54 is connected on one side to the battery pack 48 and to the other side through the two conductors of the conductor cable 40 and switch 42 for completion of the circuit. An optional flasher circuit may be embodied within the circuit by the installation, for example, of a flasher unit 60 in the circuit.

Figure 5:
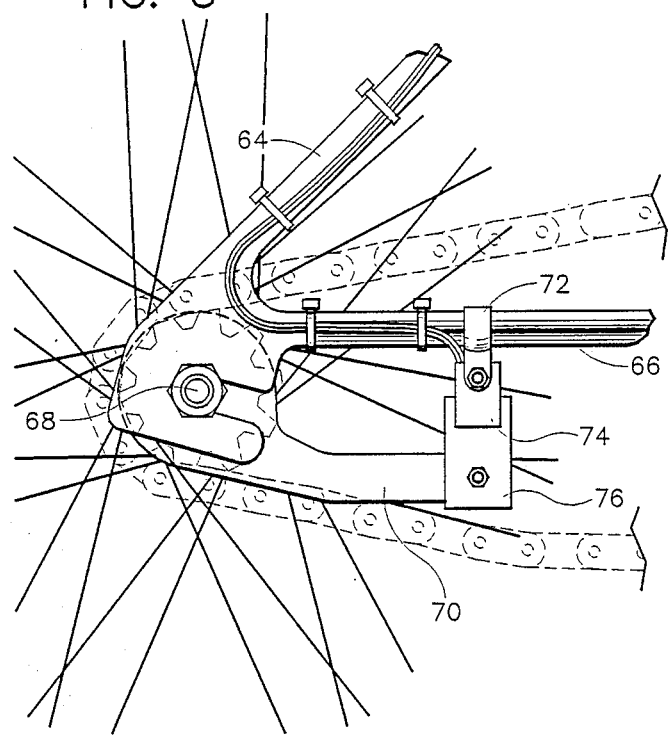
FIG. 5 is an enlarged detail view showing an alternate adaption of the actuator for the system.

Referring now to FIG. 5, there is illustrated an alternate mounting of the switch of the brake light system wherein the bicycle has what is termed coaster brakes. As illustrated in FIG. 5, the bicycle frame includes frame members 64 and 66 which mount the rear axle of the bicycle. The rear hub of the coaster brake type of drive for bicycles includes a brake actuating arm 70, which is coupled to the brake unit in the hub and is connected by a typical clevis clip unit 72 to the lower rear tube 66 of the bicycle frame.

Figure 6:
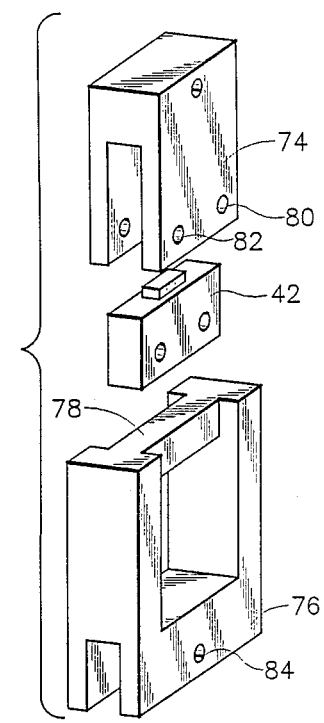
FIG. 6 is an exploded view showing details of the actuator of FIG. 5.

The switch unit of the present invention is mounted within an adaptor unit, as seen in FIGS. 5 and 6, which comprises an upper clevis unit 74 which extends down into a recess in a lower unit 76, which has a bar 78 which is straddled by the two sides of the upper unit 74, and below which the micro switch 42 is positioned. The micro switch 42 has an actuator button or bar 41 which is depressed to actuate the switch. The upper unit and the micro switch is then secured together by bolts or pins through bores 80 and 82, with the micro switch 42 and its actuator bar 41 below the bar 78 in the space therein, such that the brake actuating arm 70 is connected to the lower bracket 76 by way of a bolt through bores 84.

Action to actuate the brake results in the arm 70 actuating the brake and applying a pressure to bar 41 which simultaneously actuates the micro switch 42, thus completing the electrical circuit for the light unit. Other means of mounting the light switch unit are available and the switch unit may be mounted at other positions on a bicycle. The switch unit may be positioned at any position under a cable for either front or rear brakes and to be actuated thereby.

Figure 7:
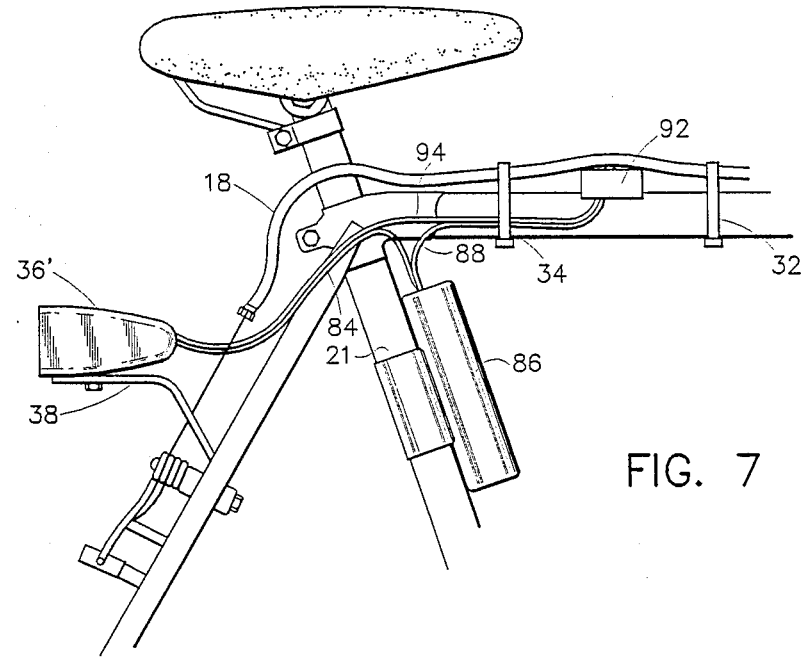
FIG. 7 is a detailed view showing an alternate embodiment.

Referring to FIG. 7, an alternate arrangement of the light system is illustrated. As illustrated in FIG. 7, a light unit 84 comprises a housing having a bulb and lens therein. A remotely positioned battery pack 86 comprises a tube for mounting four batteries, which are connected via conductors 88 to the light and 90 to a switch 92. The switch 92 is connected via a conductor 94 to the light 84. Actuation of the brakes tensions the brake cable 18, which actuates switch 92 for activating the light 84 as in the prior embodiment.

While I have illustrated and described my invention by means of specific embodiments, it is to be understood that numerous changes and modifications may be made therein without departing from the spirit and scope of the invention as defined in the appended claims.

I claim:

1. A brake light system for a bicycle having a frame comprising in combination:
   a box-like housing having an open end;
   a semi-transparent lens covering said open end;
   an electrical light bulb mounted in said housing;
   a source of electric power for said light bulb;
   conductor means for connecting said source of electric power to said light bulb; and
   normally open switch means in said conductor for mounting directly to said frame member between laterally adjacent elongated portions of said frame and a curved brake actuating cable for engagement thereby and for response to lateral pressure from said brake actuating cable tending to straighten upon application of brakes for closing said switch means and activating said light bulb.

2. A brake light system for a bicycle according to claim 1 wherein:
   said conductor means is an elongated conductive wire, and said switch means is remotely located from said light for positioning in engagement with said brake actuator cable for activating said light.

3. A brake light system for a bicycle according to claim 1 wherein:
   said source of electrical power comprises a plurality of dry cell batteries in said housing.

4. A brake light system for a bicycle according to claim 1 wherein:
   said source of electrical power comprises a plurality of dry cell batteries in a remotely located holder.

5. A brake light system for mounting a bicycle having a frame for actuation by the brake actuation means thereof, comprising in combination:
   a housing forming a box-like enclosure having an open end;
   a lens detachably mounted on and covering said open end;
   a light bulb in said housing;
   a source of electrical power;
   elongated conductor means for selectively connecting said light bulb to said source of electrical power; and
   a remotely positionable normally open pressure responsive switch in said conductor means for mounting on said frame member between laterally adjacent elongated portions of said frame and an adjacent brake actuating cable wherein said cable is curved around a portion of said switch for responding to force tending to straighten said cable resulting from actuation of said cable for closing said switch and connecting said light bulb to said source of electrical power.

6. A brake light system for a bicycle according to claim 5 wherein:
   said source of electrical power comprises a plurality of dry cell batteries in said housing.

7. A brake light system for mounting a bicycle according to claim 5 wherein:
   said source of electrical power comprises a plurality of dry cell batteries in a remotely located holder.

8. A bicycle of the type having a frame, brakes and brake actuation means, a brake light system mounted on said frame for actuation by the brake actuation means thereof, comprising in combination:
- a housing mounted on a rear portion of said frame, said housing forming a box-like enclosure having an open end;
- a lens detachably mounted on and covering said open end;
- a light bulb mounted in said housing;
- a plurality of dry cell batteries for providing a source of electrical power;
- elongated conductor means for selectively connecting said light bulb to said source of electrical power; and
- a remotely positionable normally open pressure responsive switch in said conductor means mounted on said frame between laterally adjacent elongated portions of said frame and an elongated brake actuating cable and in pressure contact with said adjacent brake actuation cable wherein said cable is curved around a portion of said switch for responding to force tending to straighten said cable resulting from actuation thereof for closing said switch and connecting said light bulb to said source of electrical power.

9. A brake light system for a bicycle according to claim 8 wherein:
   said plurality of dry cell batteries are in said housing.

10. A brake light system for a bicycle according to claim 8 wherein:
   said plurality of dry cell batteries in a remotely located holder.

* * * * *